United States Patent
Mollere

[11] 3,752,256
[45] Aug. 14, 1973

[54] METHOD FOR GENERATING SEISMIC IMPULSES BELOW THE EARTH'S SURFACE

[75] Inventor: John C. Mollere, Houston, Tex.

[73] Assignee: Western Geophysical Company of America, Houston, Tex.

[22] Filed: Dec. 14, 1970

[21] Appl. No.: 97,932

[52] U.S. Cl. .......................... 181/.5 XC, 181/.5 NC
[51] Int. Cl. .......................... B01v 1/02, G01v 1/12
[58] Field of Search ...................... 181/.5 XC, .5 R, 181/.5 NC, .5 EC; 175/4.5

[56] References Cited
UNITED STATES PATENTS

| | | | |
|---|---|---|---|
| 2,735,503 | 2/1956 | Rice et al. | 181/.5 XC |
| 2,353,484 | 7/1944 | Merten et al. | 181/.5 XC |
| 2,055,618 | 9/1936 | Blau | 181/.5 XC |
| 2,601,522 | 6/1952 | Heiland et al. | 181/.5 XC |

Primary Examiner—Benjamin A. Borchelt
Assistant Examiner—J. V. Doramus
Attorney—Michael P. Breston, Alan C. Rose, Walter R. Thiel and Alfred B. Levine

[57] ABSTRACT

This invention relates to a method and means for generating undersurface seismic impulses by positioning a combustion chamber at a desired point below the earth's surface, exploding in the chamber a first charge of an explosive gas, using the energy of the explosion to create a cavity in the soil around the combustion chamber, filling the combustion chamber and the cavity with at least a second charge of the explosive gas, and exploding the second charge both in the combustion chamber and in the cavity to produce a seismic impulse below the earth's surface.

4 Claims, 18 Drawing Figures

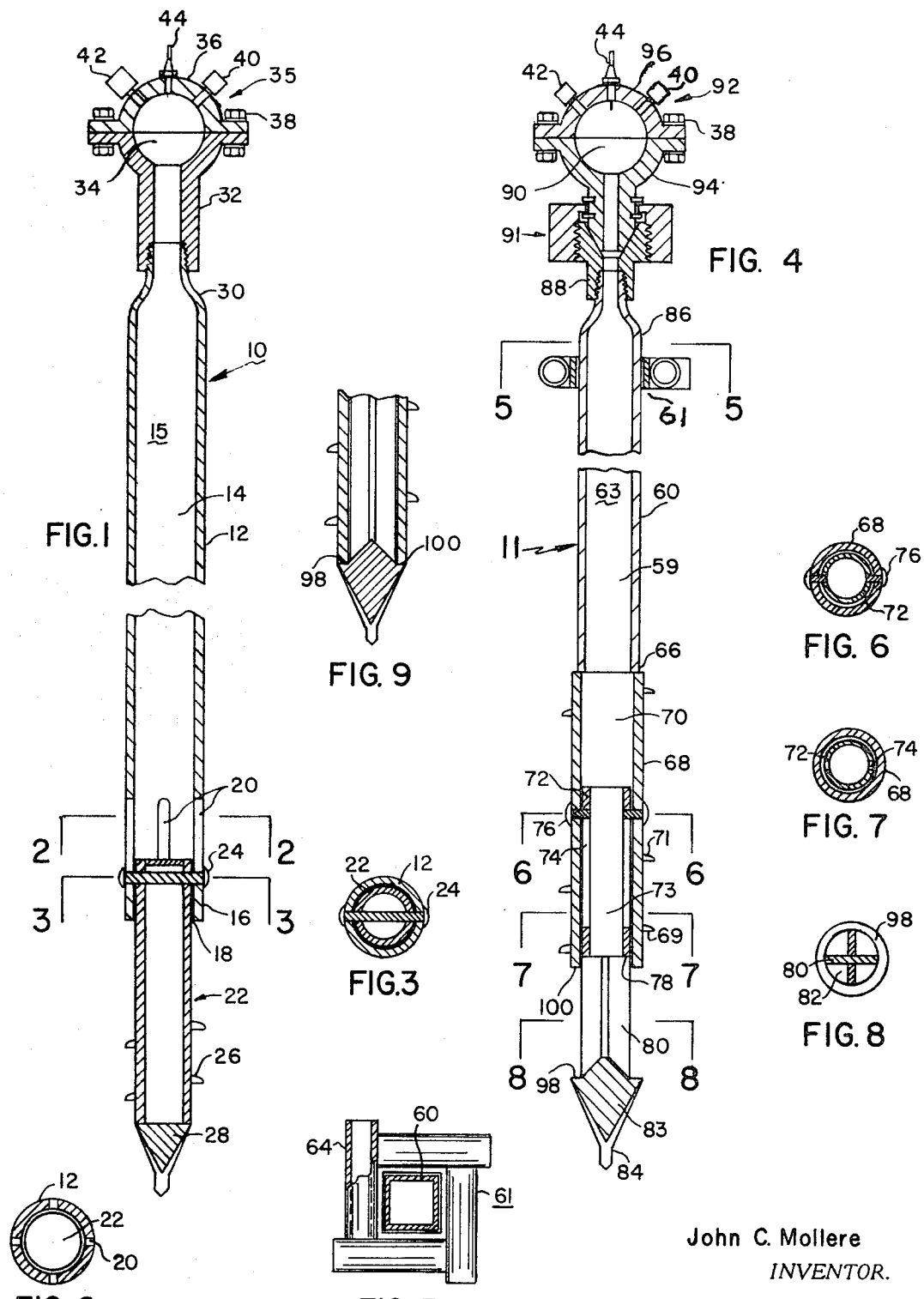

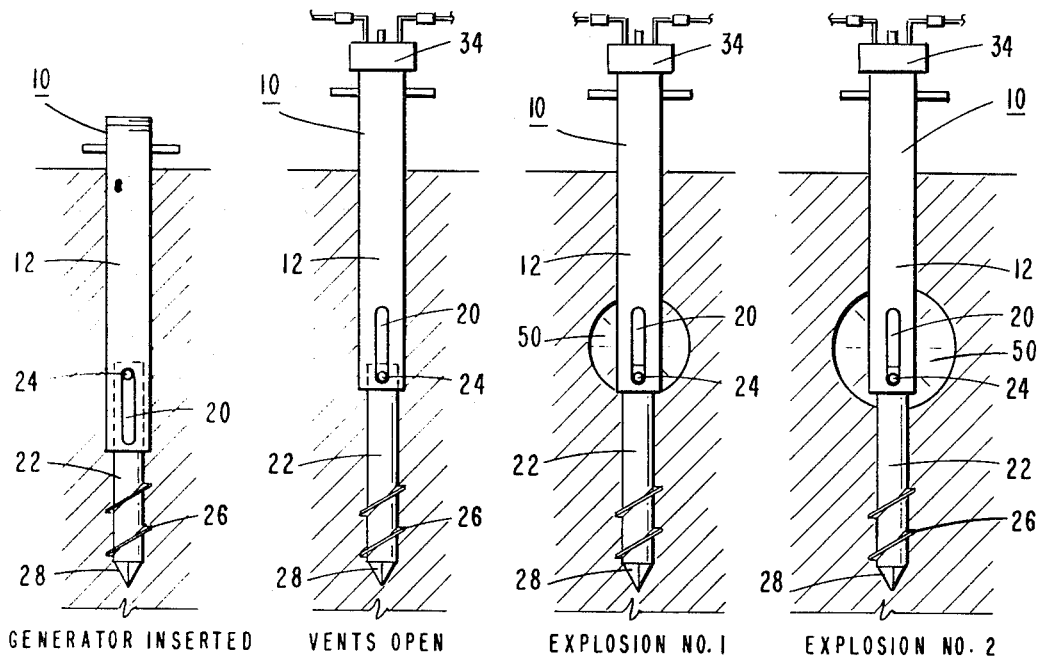
GENERATOR INSERTED
FIG. 10A.
VENTS OPEN
FIG. 10B.
EXPLOSION NO.1
FIG. 10C.
EXPLOSION NO.2
FIG. 10D.
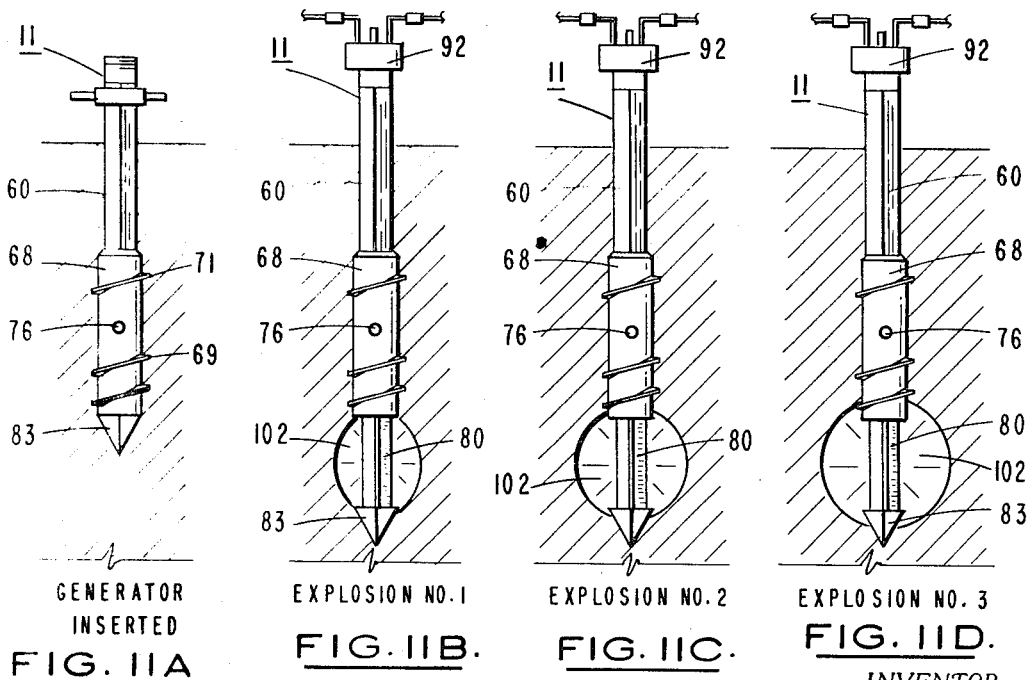
GENERATOR INSERTED
FIG. 11A.
EXPLOSION NO.1
FIG. 11B.
EXPLOSION NO.2
FIG. 11C.
EXPLOSION NO.3
FIG. 11D.

Patented Aug. 14, 1973

INVENTOR.
JOHN C. MOLLERE,
BY
MICHAEL P. BRESTON
ATTORNEY.

METHOD FOR GENERATING SEISMIC IMPULSES BELOW THE EARTH'S SURFACE

BACKGROUND OF THE INVENTION

A method has been proposed to generate undersurface seismic impulses by mechanically forming a cavity below the earth's surface, filling the cavity with a charge of an explosive gas, and exploding the charge in the cavity to thereby generate a seismic impulse against the walls of the cavity. In this method, the cavity is formed by rotating an auger-type drill into the ground to a predetermined depth below the earth's surface, and then lifting, without rotating, the drill to (1) create a relatively large cavity under the drill and (2) to compact the earth along a portion of the drill, whereby an effective seal is formed for the cavity.

It will be appreciated, that this method requires that the auger-type drill be rotated by powered rotating means and then lifted by powered lifting means.

There is a need for a method of creating seismic impulses at a desired point below the earth's surface which does not require powered rotating and/or lifting means.

There is a need for a land seismic impulse generator which is light weight, economical to manufacture, reliable in operation in various types of soils, which can withstand field abuse, and which can be positioned with hand tools at the desired point below the earth's surface. Preferably such impulse generators should be portable.

This invention fulfills the above-described and other needs, as will be apparent from the subsequent description of preferred embodiments thereof.

SUMMARY OF THE INVENTION

The method of this invention, in its broad aspect, requires positioning a combustion chamber at a desired point below the earth's surface, exploding in the chamber a charge of an explosive gas to create explosion energy, releasing this energy against the surrounding soil to thereby create a cavity in the soil immediately adjacent to the chamber, exploding in the chamber and in the thusly created cavity at least one other charge of the explosive gas, and allowing the combined explosion energy from the exploded gas in the combustion chamber and in the cavity to create a seismic impulse in the earth surrounding the cavity.

The seismic impulse generator of the invention comprises a combustion chamber and means associated with the combustion chamber to position the combustion chamber at a desired point below the earth's surface. The chamber has a gas inlet for accepting a first charge of a combustible gas and a gas outlet for venting, subsequent to the explosion of the first charge, the resulting high-pressure gaseous products of combustion into the soil surrounding the outlet. The vented, high-pressure gaseous products of combustion create a cavity around the outlet. The impulse generator then accepts at least a second charge of the combustible gas which fills both the combustion chamber and the cavity. The second charge is exploded both in the combustion chamber and in the cavity to create a high-energy, seismic impulse in the earth surrounding the cavity. A detachable mixing and firing head can be used to fill and explode each charge.

A method of geophysical exploration using a plurality of such seismic impulse generators simultaneously and/or consecutively is also described.

BRIEF DESCRIPTION OF THE DRAWINGS

FIG. 1 shows a sectional view in elevation of one embodiment of the invention;

FIGS. 2 and 3 are sectional views on lines 2—2 and 3—3, respectively, in FIG. 1;

FIG. 4 shows a sectional elevation view of a portable embodiment of the invention;

FIGS. 5—8 are sectional views on lines 5—5, 6—6, 7—7, and 8—8, respectively, in FIG. 4;

FIG. 9 is a view, partly in section, showing one manner of sealing the combustion chamber in the portable embodiment;

FIGS. 10A—10D schematically illustrate the operation of the embodiment of FIG. 1;

FIGS. 11A—11D schematically illustrate the operation of the embodiment of FIG. 4.

Referring to FIGS. 1–3, there is shown one embodiment of a land seismic impulse generator according to the invention, generally designated as 10. It includes a hollow casing 12 having a cylindrical bore 14 which forms a combustion chamber 15. The lower end 16 of casing 12 has a circular opening 18 and longitudinally extending slots 20. A movable plug, such as a hollow piston, generally designated as 22, has an outer diameter which is slightly smaller than the diameter of bore 14. A torque-transmitting and piston-retaining pin 24 retains piston 22 inside casing 12 and transmits the applied torque from casing 12 to piston 22 when casing 12 is rotated by conventional powered rotating means (not shown). Pin 24 rides in a pair of diametrically opposed slots 20 (FIG. 3). When pin 24 is in its uppermost position (FIG. 10A), slots 20 are covered by the outer wall of piston 22. When pin 24 is in its lowermost position (FIG. 10B), slots 20 are open. Piston 22 is provided with a screw-type flyte 26 about its outer cylindrical wall and with a bottom bit 28.

Figure 12:
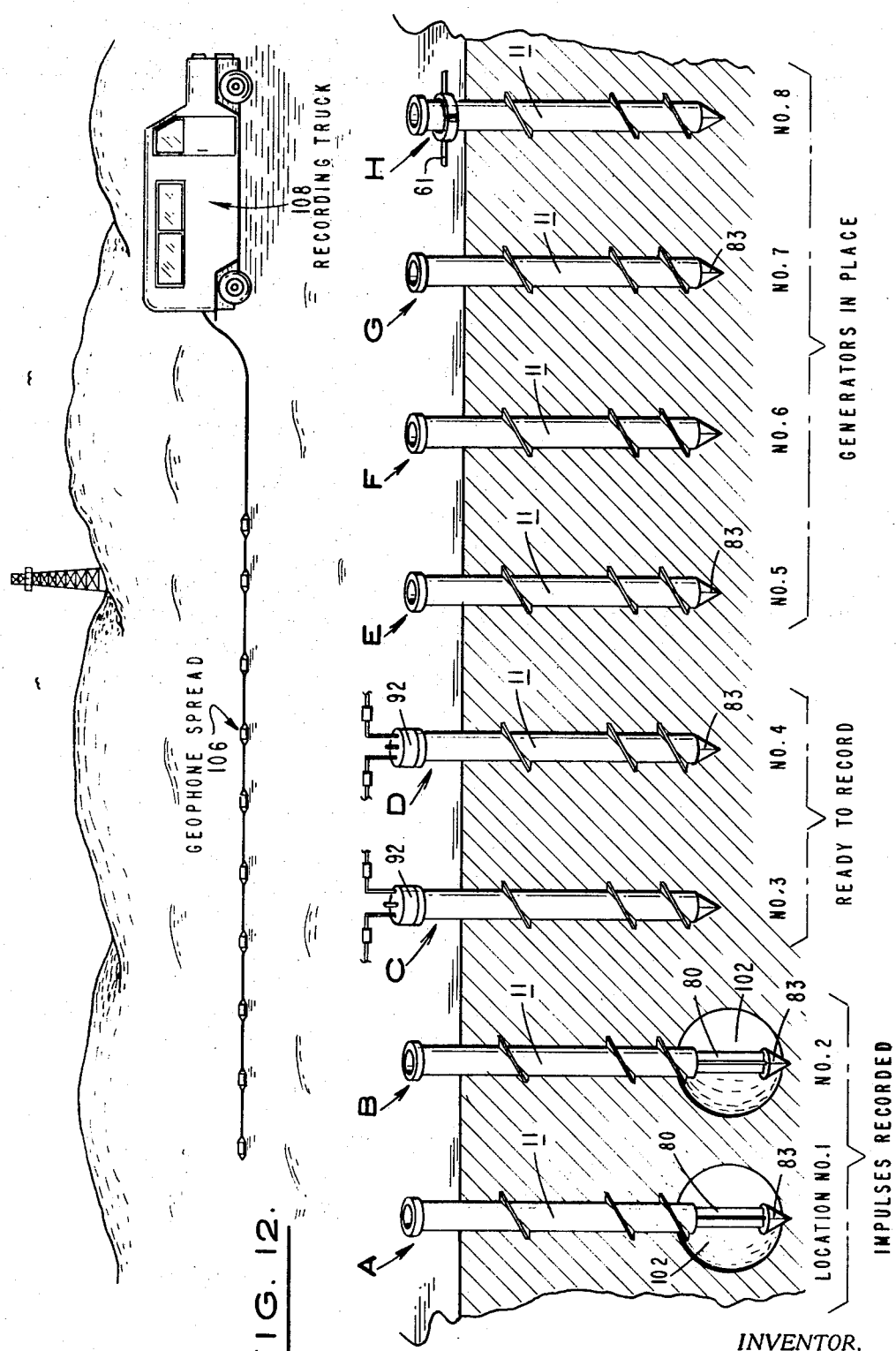
FIG. 12 schematically illustrates a method of geophysical exploration using a plurality of portable seismic impulse generators.

The upper open end 30 of casing 12 has a reduced diameter and is threadedly engagable by the lower part 32 of a mixing and firing head, generally designated as 35, defining a mixing chamber 34. The upper part 36 of mixing head 35 is bolted to the lower part 32 by bolts 38. A gas inlet 40 on head 35 is connectable to a source (not shown) of an oxidizer gas such as oxygen, and a fluid inlet 42 is connectable to a fuel gas, commonly propane. A spark plug 44 is threaded through the wall of the upper part 36 so that its electrodes are exposed to the combustible gaseous mixture formed in chamber 34.

The manner of mixing the oxidizer and fuel gases and of firing or exploding the resulting combustible mixture in chamber 34 is well known to those skilled in the art. Consequently, the auxillary equipment normally associated with inlets 40 and 42 is not shown. Such auxillary equipment typically includes solenoid-operated valves, check valves, strainers, adjustable orifices, etc. The solenoid-operated valves control the gas flow into inlets 40 and 42. The check valves prevent the back pressures from damaging the delicate solenoid-operated valves. The strainers and the gas-flow proportioning orifices respectively collect and remove foreign matter from the gases and proportion the relative gas volumes flowing through inlets 40 and 42.

In operation of the embodiment shown in FIG. 1, prior to detonating the first charge of the combustible gas mixture in combustion chamber 15, slots 20 are opened by lifting casing 12 relative to piston 22 (FIG. 10B) which is retained in the soil by flyte 26.

The pressures of the oxidizer and fuel gases admitted through inlets 40 and 42 are adjusted to about the same value. This pressure value is of course determined by the fuel supply system characteristics and by the time available for filling combustion chamber 15.

In mixing chamber 34, the oxidizer and fuel gases become thoroughly mixed in the proper proportion. The resulting combustible gas mixture of the first charge fills up combustion chamber 15. When chamber 15 is fully loaded by the first charge, the solenoid valves are closed and the first charge is ignited by spark plug 44.

Upon becoming ignited at the electrodes of spark plug 44, there is formed a detonation shock wave which moves downwardly and substantially instantaneously from plug 44 through casing 12. The explosion creates high-temperature, high-pressure gaseous products of combustion, herein called the explosion energy. This explosion energy is vented through the open slots or vents 20 into the abutting soil, thereby creating a cavity 50 in the soil around vents 20 (FIG. 10C). The first explosion is not intended to create a seismic impulse.

A second charge of the combustible gas mixture is then formed, in the manner above-described, by the mixing chamber 34 to fill both the volume of combustion chamber 15 and the volume of cavity 50. After both the combustion chamber 15 and the cavity 50 are fully filled with the second charge, a spark is again generated, at the electrodes of spark plug 44, which explodes the second charge. The total explosion energy (the energy from the charge in the combustion chamber 15 added to the energy from the charge in cavity 50) of the second charge is released to create a high-energy seismic impulse in the earth, the reflections of which are recorded by a geophone spread recording apparatus (not shown) in a manner well known in the art.

A third charge may be admitted and exploded in combustion chamber 15 and in cavity 50. Since cavity 50 becomes enlarged, depending on the hardness of the soil, following each explosion, there is a limit on the number of charges which can be thusly exploded and yet maintain cavity 50 under the earth's surface.

The embodiment described in FIG. 1, as previously mentioned, is particularly adaptable for being screwed into the ground by a conventional rotating source (not shown), say to a depth of about ten feet.

The seismic impulse generator, generally designated as 11, shown in FIG. 4, is especially adapted for portable operation and for rotation with muscle power only. It includes a kelly 60 having a rectangular cross section, as shown in FIG. 5. Kelly 60 is adapted to be rotated by a rectangular drive handle 61 which, for simplicity of construction, can be made by welding together four sections of steel pipe 64, as shown. Handle 61 can be easily rotated by two or four men with the aid of round bars (not shown) inserted into the pipes 64.

The lowermost end 66 of kelly 60 is welded to a tubular casing 68 having thereabout a lower flyte 69 and an upper flyte 71. Movably mounted in bore 70 of casing 68 is a plug such as a slotted, hollow, cylindrical piston 72 having a number, say four, of longitudinal slots 74 and a bore 73. Extending through a pair of diametrically opposed slots 74 and through the wall of casing 68 is a torque-transmitting and piston-retaining fixed pin 76. Welded to the lowermost end 78 of piston 72 are two V-shaped bars 80. Bars 80 are welded edge-to-edge and define, together with the bottom open end of bore 73 four vents 82. To the lower ends of bars 80 is welded a bit 83 preferably having a cutting edge 84.

The uppermost end 86 of kelly 60 has a reduced diameter and is threadedly coupled to an adapter bushing 88 which forms part of a quick coupling-and-decoupling connector, generally designated as 91. Connector 91 quickly connects a firing and mixing head 92 to kelly 60. Head 92 includes a mixing chamber 90, a bottom part 94 and an upper part 96. To indicate the similarity between heads 35 and 92, the same numerals are used therein to designate similar parts.

In operation of the portable seismic impulse generator 11, bore 59 of kelly 60, bore 70 of casing 68, and bore 73 of piston 72 form together a combustion chamber 63 which normally is closed by the engagement of an annular shoulder 98 on bit 83 with edge 100 of casing 68 (FIGS. 9 and 11A).

The first explosion of the first charge of the combustible gaseous mixture in explosion chamber 63 projects bit 83 outwardly. The explosion energy resulting from the first explosion creates a cavity 102 around vents 82 (FIG. 11B). The first explosion is not intended to have sufficient energy to create a useful seismic impulse. A second charge of a combustible gaseous mixture is then admitted into explosion chamber 63 and cavity 102. The second explosion, resulting from the detonation of the second charge, creates a high-power seismic impulse in the soil surrounding cavity 102. This seismic impulse is the result of the combined explosion energy created in explosion chamber 63 and cavity 102. In a similar manner, a third explosion can be created by filling and detonating a third charge admitted into combustion chamber 63 and into the enlarged cavity 102 (FIG. 11D).

The method of geophysical exploration using a plurality of portable seismic impulse generators 11 is schematically illustrated in FIG. 12. A plurality (say eight) of portable generators 11 are screwed into the ground by manually rotating handles 61. In one embodiment, the length of generator 11 was about 12 feet, and the portion of generator 11 screwed into the ground was about 10 feet. Generators 11 are spaced apart as determined by the terrain characteristics and the geophysical method employed. The lower flyte 69 screws generator 11 into the ground, while the upper flyte 71 assists the insertion of the generator into the ground. Since cavity 102 may become so large as to remove the soil from the lower flyte 69, the upper flyte 71 will also be useful in unscrewing generator 11 from ground.

While one crew screws generators 11 into the ground, another crew quickly attaches one or more mixing and firing heads 92 to one or more generators which it is desired to fire (generators C and D in FIG. 12). These generators are then fired in the manner previously described to create seismic impulses in the ground, the reflections of which are detected by a geophone spread 106. The electrical signals produced by the geophone spread 106 are recorded by a recording truck 108. After generators C and D have been fired the desired number of times, mixing and firing heads 92 are quickly disconnected therefrom. These heads are then connected to one or more other generators 11 in the next group which it is desired to fire. The next group is then charged and fired, the resulting electrical signals recorded, and the process is repeated.

While the invention has been described with reference to specific embodiments thereof, it is subject to modifications, as will be apparent to those skilled in the art, all falling within the claims attached hereto.

What I claim is:

1. A method of generating a seismic impulse below the earth's surface comprising the steps of:

mechanically inserting a hollow member below the earth's surface, said member defining a combustion chamber having a gas inlet and a gas outlet, a plug in said outlet, introducing an initial charge of explosive gas through said inlet into said combustion chamber with said outlet closed by said plug, detonating said initial charge in said combustion chamber to move said plug outwardly of said outlet thereby forming a cavity in the portion of the earth surrounding said outlet, introducing a subsequent charge of explosive gas through said inlet into said combustion chamber and through said outlet into said cavity, and detonating said subsequent charge in said cavity to thereby generate a seismic impulse in the earth.

2. The method of claim 1 wherein said cavity is created by venting through said outlet the high-pressure gaseous products of combustion resulting from the explosion of said initial charge in the combustion chamber.

3. The method of claim 1 wherein the step of mechanically inserting said hollow member comprises, screwing in said member to a desired depth below the earth's surface.

4. The method of claim 1 wherein said cavity is created by the outward mechanical movement of said plug.

* * * * *